United States Patent Office 3,256,064
Patented June 14, 1966

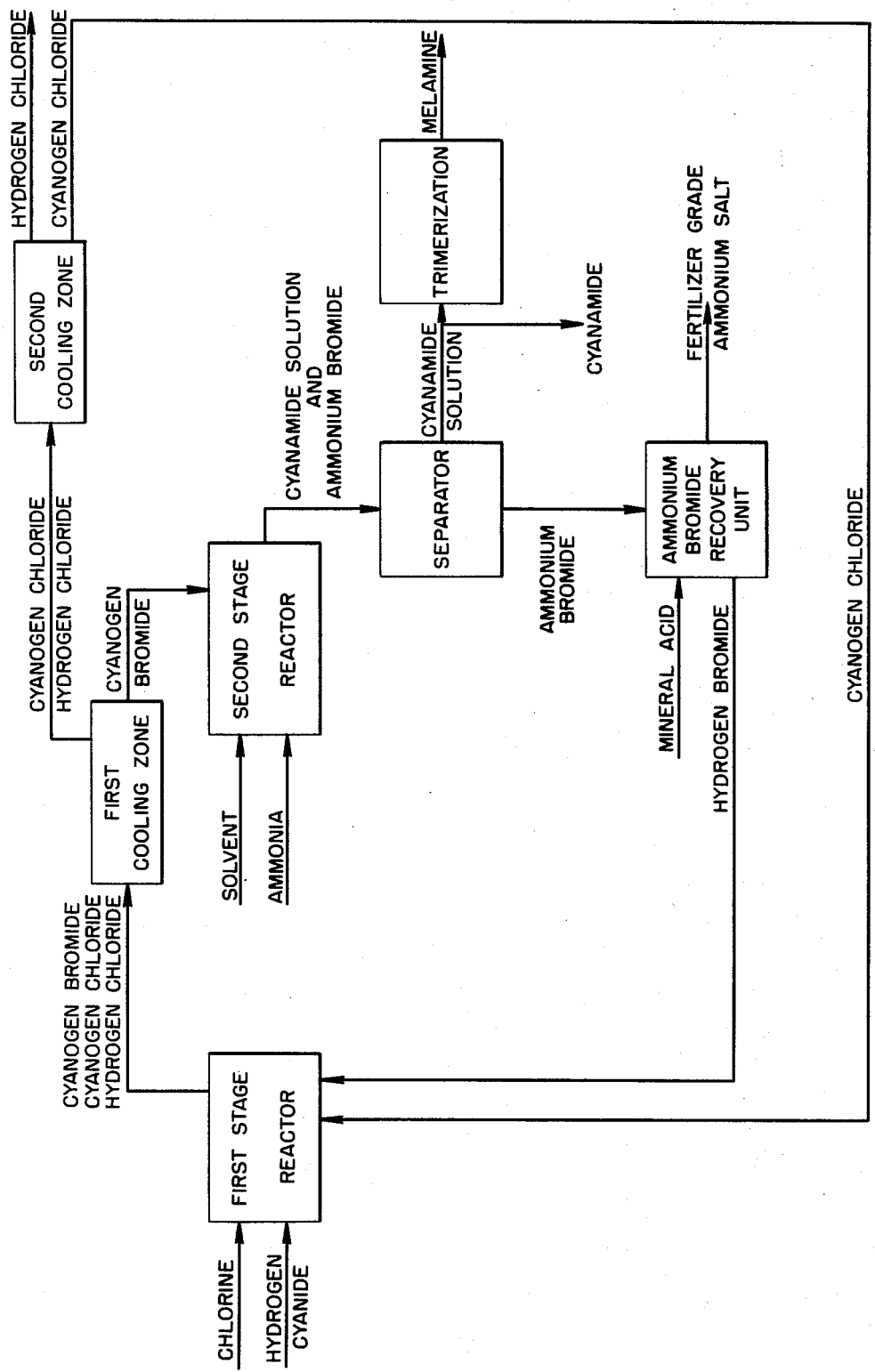

3,256,064
CYCLIC PROCESS FOR THE PREPARATION OF CYANAMIDE AND MELAMINE
John A. Sherred, Lakewood, Cleveland, Ohio, assignor to The Standard Oil Company, Cleveland, Ohio, a corporation of Ohio
Filed July 11, 1962, Ser. No. 209,130
4 Claims. (Cl. 23—190)

This invention relates to a cyclic process for the preparation of cyanamide and melamine from chlorine, hydrogen cyanide, ammonia and hydrogen bromide by way of cyanogen bromide in which the only materials consumed are chlorine, hydrogen cyanide, ammonia and mineral acid. A portion of the ammonia is recovered in the form of a salt such as ammonium sulfate, phosphate or nitrate, usable as a fertilizer.

There are a number of processes available for the production of cyanamide on a continuous or semi-continuous basis from relatively common and inexpensive starting materials. The most attractive commercial process employs an electrolytic cell for the conversion of hydrogen cyanide and ammonium halide to the cyanogen halide used to form cyanamide. Ammonium halide is formed as a by-product of the cyanamide reaction, and is recycled to the electrolytic cell, where it is required as a reactant. The design and efficient operation of such cells gives rise to many problems, as does recycling of ammonium halide, and a route avoiding these problems is provided by the present invention.

Broadly, in the process of this invention, in the first stage, hydrogen bromide, chlorine and hydrogen cyanide are reacted to yield hydrogen chloride, cyanogen chloride and cyanogen bromide. In the second stage, the ammonolysis, the cyanogen bromide is reacted with ammonia, desirably in the presence of a solvent, to form cyanamide, which in the third stage is trimerized to melamine. The ammonium bromide formed as a by-product in the second stage is reacted with a mineral acid whose anion forms a useful ammonium salt, such as the sulfate, phosphate or nitrate. The hydrogen bromide thus obtained can be recycled to the first stage.

The reactions involved in the process of this invention can be briefly summarized as follows:

*First stage reactions:*

(1) $HCN+HBr+Cl_2 \rightarrow CNBr+2HCl$
(2) $2HBr+Cl_2 \rightarrow 2HCl+Br_2$ (possible reaction mechanism or other reactions)
(3) $HCN+Br_2 \rightarrow HBr+CNBr$
(4) $HCN+Cl_2 \rightarrow CNCl+HCl$ (side reaction)

*Second stage ammonolysis reaction:*

(5) $CNBr+2NH_3 \rightarrow CNNH_2+NH_4Br$

*Third stage trimerization reaction:*

(6) $3CNNH_2 \xrightarrow{NH_3} C_3N_3(NH_2)_3$

*Ammonium halide conversion to useful salt:*

(7) 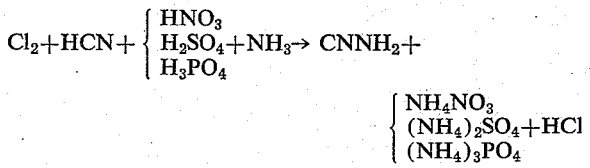

In a preferred embodiment of this invention, the first stage reaction is carried out in the presence of an excess of cyanogen chloride, thus repressing side reaction (4) and minimizing the amount of cyanogen chloride which must be separated from the cyanogen bromide at the end of the reaction.

Thus, the equation of the preferred first stage reaction is $HBr+Cl_2+HCl \rightarrow CNBr+2HCl$.

The composite overall reaction for the process of the invention in making cyanamide is:

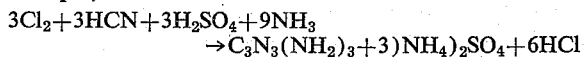

and in making melamine it is: (using sulfuric acid, for example)

$3Cl_2+3HCN+3H_2SO_4+9NH_3$
$\rightarrow C_3N_3(NH_2)_3+3(NH_4)_2SO_4+6HCl$

The figure is a flow sheet illustrating the process of this invention.

In the preferred embodiment of the present invention, hydrogen bromide (such as hydrogen bromide recycled from the ammonium halide recovery), chlorine and hydrogen cyanide are mixed and brought to the first stage reaction conditions. Preferably, the hydrogen bromide is added to the reaction mixture before or simultaneously with the chlorine. A suitable solvent for all of the components is preferably present. The solvent is inert to and dissolves at least a portion of each of the reactants, and preferably has a boiling point of at least 10° C. above the reaction temperature. The particular type of solvent employed is not critical, since it need not be removed at the conclusion of the reaction, and can be continually recycled for reuse. Suitable solvents are water and inert alcohols and ethers having sufficiently high boiling points such as t-butanol, isobutanol, isopropanol, dipropyl ether and dibutyl ether.

Chlorine, hydrogen cyanide and hydrogen bromide should be present in the reaction mixture in approximately stoichiometric quantities. If the hydrogen bromide is recycled, fresh hydrogen bromide need be supplied only when and if necessary. Hydrogen cyanide can be present in excess, but chlorine should not be, since cyanogen chloride formation is to be repressed insofar as possible. Furthermore, neither chlorine nor hydrogen bromide would be recycled, but hydrogen cyanide can be recycled with the cyanogen chloride separated from the first stage reaction product.

The stated reactions will proceed when between about 0.8 and 1.5 moles of hydrogen cyanide per mole of chlorine and between about 0.8 and 1.5 moles of hydrogen cyanide per mole of hydrogen bromide are present in the reaction mixture. Less hydrogen cyanide will result in inefficient utilization of chlorine and/or hydrogen bromide. However, to minimize the hazards associated with the handling of hydrogen cyanide, enough chlorine or hydrogen bromide is preferably present to insure the complete reaction of all of the hydrogen cyanide in each pass or cycle.

The temperature of the reaction mixture during the first stage reaction is maintained above about 65° C., and can range to as high as about 250° C. or more. The reaction is preferably maintained at a temperature of between about 65° and 90° C. Temperatures higher than 250° C. can be employed but are unnecessary, and require the use of high boiling expensive solvents, or higher pressures. The time necessary for completion of the reaction will vary within wide limits depending upon the temperature of the reaction, the quantities and concentrations of the reactants, and the solubilities of the reactants and products in the solvent. In general, the reaction time varies between about 15 minutes to 2 hours, preferably between about 30 to 60 minutes.

At the conclusion of the first stage reaction, the gas phase above the reaction mixture will consist essentially of hydrogen chloride, cyanogen chloride and cyanogen bromide. Preferably, the cyanogen bromide is separated from the other two components. This separation can be accomplished, for example, by cooling the gas to between 55 and 60° C. This liquefies the cyanogen bromide, which has a boiling point of about 61° C., while the lower boiling cyanogen chloride and hydrogen chloride remain in the vapor state. The separated cyanogen bromide can then be mixed with ammonia and a suitable solvent for cyanamide, and allowed to react for a sufficient time to form cyanamide.

In another embodiment of the invention, the mixture of gases from the first stage reaction can be treated to remove only the hydrogen chloride. The mixture of cyanogen chloride and bromide would then be used in the second stage reaction. A disadvantage of this procuredure is that hydrogen bromide recovered from the treatment of ammonium bromide with acid would have to be separated from hydrogen chloride, a more difficult separation step.

The solvent used in the second stage ammonolysis reaction should have a good solubility for cyanamide but a low solubility for ammonium bromide. The amount of ammonium bromide in solution must be held to a minimum to prevent side reactions. The solvents which can be used in the second stage (ammonolysis) reaction are capable of dissolving at least 50 grams, and preferably 100 grams or more, of cyanamide per liter, and not in excess of about 5 grams, and preferably less than 1 gram, of ammonium bromide per liter, and preferably have a boiling point between about 50 and 250° C. Ammonia must also, of course, be soluble in the solvent at the ammonolysis temperatures. The solvent must also be inert under the reaction conditions. It should not, for example, react with ammonia or with cyanogen bromide. Since the ammonium bromide that is produced in the second stage reaction is subsequently treated to liberate hydrogen bromide for recycling to the first stage reaction, the ammonium bromide that separates from the solvent during the second stage reaction should be in the form of crystals that are easily handled. The solvent should have a sufficiently low boiling point to be easily separated from ammonium bromide crystals. Solvents meeting these requirements are capable of giving yields of cyanamide in excess of 85%. The recovery of ammonium bromide is essentially quantitative.

If the cyanamide is to be recovered, the solvent should also have a boiling point sufficiently removed from the boiling point of cyanamide to permit separation by distillation. If, on the other hand, the cyanamide solution is to be used directly to form melamine the solvent should also have a low solubility for melamine, and it should be inert under the more drastic trimerization reaction conditions.

Solvents meeting these requirements are selected from the group consisting of cyclic ethers; polyoxyalkylene ethers; sulfones, and especially the sulfolanes, five-membered ring compounds containing the group

in the ring, and having from four to twelve carbon atoms; esters of aliphatic fatty acids and aliphatic alcohols having from three to about ten carbon atoms; and aliphatic nitriles having from two to about ten carbon atoms.

There is no criticality in molecular weight, except that the solvent should, of course, be a liquid preferably at room temperature and certainly at reaction temperature, and should have a sufficiently low boiling point to permit its separation from the product at the conclusion of the process.

Polyoxyalkylene and cycloalkylene ethers best meet the above requirements, and of these, tetrahydrofuran, dimethoxyethane (dimethyl ethylene glycol) and 1,4-dioxane are preferred. Dimethyl triethylene glycol, dibu-toxy diethylene glycol, dimethyl diethylene glycol, dibutyl triethylene glycol, dimethyl tetraethylene glycol and diethyl diethylene glycol are additional exemplary polyoxyalkylene ethers. The polyoxyalkylene ethers have at least two ether groups linked by an alkylene group and terminal alkyl groups are attached to the first and last ether groups in the chain. The ether should not have an appreciable hydrocarbon character, and it is therefore important that there be a large proportion of ether groups to carbon atoms, preferably at least one ether oxygen for each five carbon atoms.

The cycloalkylene ethers are ring compounds having the ether oxygen in the ring, which is composed of oxygen and carbon atoms. The ring will contain at least one ether oxygen for each five carbon atoms. 1,3-dioxane, and tetrahydropyran are additional examples of cyclic ethers.

The sulfolanes are ring compounds having the general structure:

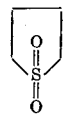

The first member of the series is sulfolane, thiophan sulfone. Additional examples are dimethyl sulfolane, methyl sulfolane, and dibutyl sulfolane.

The organic esters of fatty acids and aliphatic alcohols include ethyl acetate, ethyl butyrate, isopropyl butyrate, ethyl caproate, methyl 2-ethyl hexoate, isobutyl butyrate, ethyl propionate, isopropyl valerate and 2-ethyl hexyl acetate.

Acetonitrile, propionitrile, isobutyronitrile, and butyronitrile are exemplary nitriles.

It is important that the ammonolysis reaction mixture contain a slight excess of ammonia, in order to obtain complete reaction of the cyanogen halide. Hence, the ammonia-to-cyanogen halide ratio should be at least 2. Ratios in excess of about 2.3 can be used, provided the ammonia is removed before ammonium halide is separated, since otherwise it leads to undesirably large amounts to residual halide in the solution. The preferred range of ratios is from about 2 to 2.3.

The reaction is exothermic. The amount of heat to be removed is rather large, approximately 56 Kcal. per mol. Therefore, it may be desirable to cool the reactants to a very low temperature initially; the reaction will start at temperatures as low as −40° C. The optimum yields are obtained at reaction temperatures of from 0° C. to about 10° C., but temperatures as high as 80° C. to 100° C. can be used advantageously under pressure to maintain the reactants in the liquid phase. Because the reaction is exothermic, it is rather rapid, and may be completed in from 15 minutes to a few hours time. The reaction proceeds very rapidly at room temperature, and is complete in about 30 minutes.

The lower the reaction temperature, the more compact the deposit of ammonium bromide crystals that is obtained, and this type of deposit is advantageous because of easy filtration. At temperatures above or near the boiling point of the cyanogen bromide, about 61° C., a large amount of the bromide will appear in the vapor phase above the reaction mixture, and this may be undesirable because of the loss thereof in undesired side reactions. This problem can be avoided by keeping the reactor full, i.e. a minimum of freeboard above the reaction mixture. If cyanamide is the desired end product, the reaction temperature should not be permitted to exceed 100° C. because of the possibility of other or side reactions.

The concentration of the reactants in the reaction solution can be widely varied. Good yields of cyanamide are obtainable at concentrations of cyanogen bromide as low as about 0.01%. The maximum concentration is imposed by the need for good contacting efficiency between the ammonia and the reaction mixture. At above about 35% weight by volume cyanogen bromide the reaction mixture becomes too viscous or pasty due to suspended ammonium bromide to permit good control of the reaction. The cyanogen bromide concentration has a relatively small effect upon the yield of ammonium bromide or cyanamide, but the purity of the product is improved by use of dilute solutions containing from 6 to 18% cyanogen bromide.

The solvent employed should be substantially anhydrous, for optimum yields. Ammonium bromide is extremely soluble in water, and the presence of water can therefore lead to losses of this product, thus increasing the cost of operation. However, the reaction will proceed in the presence of water, and rather large amounts can frequently be tolerated, up to about 10% by weight of the solution.

It is usually preferably in carrying out the reaction to disssolve the cyanogen bromide in the solvent, and then admit ammonia gas or liquid ammonia at a rate sufficient to permit control of the reaction temperature within the desired range. The reaction system should be provided with a means for carrying off the heat liberated, such as refluxing beneath a condenser, or by cooling coils inserted within the reaction vessel. The refluxing temperature can be lowered if the solvent has a higher boiling point than the desired reaction temperature, by including a small amount of a compatible inert lower boiling liquid, such as isopentane, pentane and dimethyl ether. As the reaction proceeds, ammonium bromide will separate out, and it will be desirable to agitate the system to maintain uniformity. After reaction is completed, usually in from 15 minutes to about 5 hours, the precipitated ammonium bromide is removed, such as by filtration, decantation, or centrifugation. If cyanamide is to be recovered, the reaction solvent is then separated by vacuum or atmospheric pressure distillation at a temperature below that at which the cyanamide will be dimerized to dicyandiamide, trimerized to melamine, or otherwise decomposed or polymerized.

The crude cyanamide solution that is recovered at the conclusion of the reaction contains principally cyanamide with only small amounts of polymers. At the higher reaction temperatures, a larger proportion of polymers are obtained. The cyanamide can be freed from such impurities by cautious distillation or by recrystallization from a solvent for cyanamide, such as a mixture of diethyl ether and benzene, or chloroform, or carbon disulfide. Indeed, a suitable choice of the solvent for the ammonolysis, such as tetrahydrofuran, will permit the cyanamide to be crystallized in substantially pure form from the concentrated, chilled reaction mixture.

The cyanamide solution can, if desired, be further reacted to form melamine. In such event, the solvent employed in the ammonolysis reaction can be used provided it is also non-reactive under the more severe trimerization conditions. In addition, the solvent should be a relatively poor solvent for melamine. Classes of solvents meeting these stringent requirements are the polyoxyalkylene ethers and the cycloalkylene ethers mentioned above.

In carrying out the trimerization to melamine, the solvent containing cyanamide, after separation of the ammonium bromide, is pumped into an autoclave which is pressured with ammonia and brought to reaction temperature for trimerization to melamine.

The trimerization reaction is carried out at somewhat higher temperatures and therefore somewhat higher pressures than the ammonolysis. The temperature is at least 150° C. up to about 275° C., and preferably from 175° C. to 225° C. At too low a reaction temperature, below about 150° C., the formation of dicyandiamide is favored, despite the presence of ammonia. Temperatures above 275° C. can be used, provided the volatility of the solvent under these conditions is not so great that the pressures in the autoclave are excessive. Actually there is little reason to go about 275° C. or even 225° C. since nearly complete conversion to melamine is obtainable at this temperature or below, in reasonable reaction times of less than about one hour.

The time required for conversion of cyanamide to melamine in good yield will depend upon reaction temperature. The higher the temperature, the more rapid the conversion. In general, reaction times of from one-half hour to one hour are sufficient, although times of up to 10 hours can be used without disadvantage. However, there is certainly no point in continuing the reaction beyond the stage at which a satisfactory yield of melamine is obtained, inasmuch as any unreacted cyanamide or dicyandiamide in the reaction solution, after separation of melamine, can be reused for a further conversion.

The concentration of cyanamide in solution in the trimerization step is in no way critical, and will, of course, depend upon the amount of conversion obtained in the ammonolysis step. Usually, under the ammonolysis conditions set forth, conversions are obtained sufficient to produce a cyanamide concentration of from about 0.5 to about 25%.

The presence of ammonia is important in order to drive the reaction towards a more complete trimerization to melamine. In the absence of ammonia, the yield of dicyandiamide will be approximately equal to the yield of melamine, indicating that the dimerization and trimerization reactions proceed at approximately equal rates. Ammonia may increase the rate of trimerization, such that dicyandiamide is converted to melamine more or less as quickly as it is formed, and therefore is not present in a substantial amount in the reaction product.

The amount of ammonia required to obtain this beneficial result is rather small, and as little as 0.1 mol of ammonia to each mol of cyanamide is sufficient, but preferably the amount of ammonia is at least 0.5 mol per mol of cyanamide. There is no upper limit on ammonia concentration, and as much as 10 mols of ammonia per mol of cyanamide can be used. Since the ammonia is not consumed in the course of the reaction and can be recovered for reuse, as much ammonia can be used as is desired, but obviously there is no advantage in using more ammonia than is necessary to obtain a quantitative conversion of cyanamide to melamine.

At the conclusion of the trimerization, the crude melamine is separated from the reaction mixture by centrifugation, filtration or decantation, and the residual liquor or filtrate is then returned to the ammonolysis step for reuse, if the amount of dissolved material is negligible. If the reaction mixture contains a substantial quantity of cyanamide, the solvent solution can be concentrated, the solvent recovered being returned to the ammonolysis step, and the residue, a concentrated cyanamide solution, is then returned to the autoclave for further passage through the trimerization reaction. The ammonia recovered is returned to the ammonolysis solution.

The crude melamine can be used as such or, if further purification is desirable, can be recrystallized from water.

When desired, the cyanamide solution produced in the ammonolysis step of this invention can be reacted with an organic nitrile to form substituted guanamines. If the solvent employed in the ammonolysis step were an organic nitrile, the cyanamide solute and the nitrile solvent could be reacted to form the corresponding guanamine without the necessity of further nitrile addition.

The guanamine-forming reaction will take place with any nonhomopolymerizable nitrile that is free from other groups reactive with cyanamide or ammonia, and that has one or a plurality of nitrile groups. A mononitrile gives rise to a monoguanamine, while a dinitrile can react at both nitrile groups to give a diaminotriazine compound. Thus, for example, dinitriles such as succinonitrile give diamino-s-triazinyl ethane:

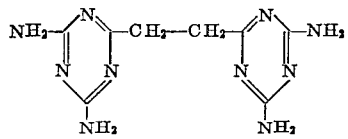

Those skilled in the art will perceive from the above that any of the following nitriles, to mention only a few, can be effectively employed in the process of the invention: acetonitrile, propiononitrile, 3-butenonitrile (allyl cyanide), butyronitrile, oleonitrile, isobutyronitrile, benzonitrile, cyclohexylnitrile, adiponitrile, glutaronitrile, succinonitrile, 1,4-dicyanocyclohexane, methoxyacetonitrile, ethoxybutyronitrile, and alpha-phenyl propionitrile.

The nitrile can either be added to the cyanamide solution derived from the ammonolysis reaction, or the solvent employed in the ammonolysis can be a nitrile meeting the solvent requirements in which case no additional nitrile need be added to form guanamine.

The guanamine reaction will proceed at an elevated temperature above about 90° C. and preferably above about 150° C. There is no critical upper limit on reaction temperature except that imposed by the stability of the reactants and the guanamine reaction product. However, reaction temperatures in excess of about 250° C. usually are not required, and temperatures between about 150° C. and 200° C. are preferred.

A sufficient pressure is imposed to maintain the reactants in the liquid phase. The pressure required will, of course, depend upon the reaction temperature and the volatility of the nitrile, and the amount of ammonia present. A sufficient pressure of ammonia is required in order to direct the reaction in favor of guanamine formation. In general, an amount of ammonia within the range from about 0.5 to about 10 mols per mole of cyanamide is adequate, and amounts of from 3.5 to 6.5 mols per mol of cyanamide are preferred. Accordingly, reaction pressures of from 100 to about 1000 p.s.i.g. usually are employed, although from 300 to 600 p.s.i.g. are adequate. Ammonia is not consumed in the reaction, and after completion of guanamine formation, the ammonia and the solvent, if any, together with unreacted nitrile can be recovered and recycled.

The reaction is conducted in a pressure vessel adequate to withstand the pressures required. After the formation of the cyanamide in accordance with this invention, excess nitrile can, if desired, be removed by distillation and reused. The cyanamide-nitrile solution or the cyanamide-solvent-nitrile mixture is added to the guanamine reactor and the mixture then pressured with the desired amount of ammonia and brought to reaction temperature. The reaction proceeds rapidly, and is ordinarily complete in about one to four hours, although frequently, particularly at elevated temperatures and high pressures, the reaction may be completed in about ten minutes.

The nitrile and cyanamide are reacted in at least approximately stoichiometric proportions, with an excess of nitrile generally maintained to retain the cyanamide in solution. Stoichiometrically, 0.5 mol of nitrile is required for each mol of cyanamide, but an amount of nitrile as high as 20 mols per mol of cyanamide can be used. Ratios of from about 1 to about 10 are usually preferred inasmuch as no more than 10 mols of nitrile is normally needed for solution of the amount of cyanamide employed.

An important advantage of the process of the invention is that it is unnecessary to recycle the ammonium bromide recovered from the second stage ammonolysis reaction. Instead the ammonium bromide can be utilized economically by treatment with a strong mineral acid to form an ammonium salt which is useful as a fertilizer while thereby liberating gaseous hydrogen bromide which is recycled to the first stage. The preferred mineral acids are nitric acid, sulfuric acid and phosphoric acid, which produce ammonium nitrate, sulfate and phosphate fertilizers.

The reaction with ammonium bromide can be carried out at room temperature, and is preferably accomplished in aqueous solution to dissipate the heat liberated during the course of the reaction. The ammonium bromide recovered from the ammonolysis can be dissolved in water and an aqueous solution of the appropriate acid added.

The amount of acid employed is stoichiometrically selected according to the ammonium salt desired. Thus, one mol of sulfuric acid is reacted with one mol of ammonium bromide to form ammonium acid sulfate,

If two mols of ammonium bromide are reacted with one mol of sulfuric acid, the ammonium salt formed will be ammonium sulfate, $(NH_4)_2SO_4$. Two mols of ammonium bromide are reacted with two mols of phosphoric acid to obtain diammonium acid phosphate. Thus it can be seen that at least one mole of a monobasic acid, 0.5 mol of a dibasic acid or 0.33 mol of a tribasic acid should be present per mol of ammonium bromide. An excess of acid above stoichiometric quantities would not be harmful.

After saturation of the aqueous solution with the hydrogen bromide, the hydrogen bromide is liberated in the course of the reaction in vapor form, and is recycled to the first stage. This reaction can recover substantially all of the hydrogen bromide used in the process. Accordingly, once equilibrium conditions have been achieved in a continuous process, very little if any hydrogen bromide need be added at the first stage. To detect losses, the amount of hydrogen bromide recycled can be metered. If any loss has occured, additional hydrogen bromide can be added.

The mixture of cyanogen chloride and hydrogen chloride separated from the cyanogen bromide after leaving the first stage reaction is subsequently cooled to below 10° C. so as to liquefy the cyanogen chloride while maintaining the hydrogen chloride in the vapor state. The liquefied cyanogen chloride is then recycled to the first stage reaction.

In accordance with the law of mass action, side reaction (4) above, between hydrogen cyanide and chlorine to yield cyanogen chloride, will be repressed by appreciable amounts of cyanogen chloride. Accordingly, the presence of cyanogen chloride in the first stage reaction will favor utilization of hydrogen cyanide in the formation of cyanogen bromide. At the outset of the process, since no cyanogen chloride has yet been formed, an appreciable quantity of cyanogen chloride will be formed during the first stage reaction. However, this cyanogen chloride will be continuously recycled, so that, once equilibrium is reached, little or no additional cyanogen chloride will be formed. In order to more rapidly achieve equilibrium conditions, it is often desirable, in initiating the process, to add an appreciable quantity of cyanogen chloride, thus insuring that substantially all the hydrogen cyanide added initially will be used to form cyanogen bromide.

The following examples represent, in the opinion of the inventors, the preferred mode of carrying out this invention.

EXAMPLE I

Five gallons of water were added to a ten gallon first stage reactor and thereafter three mols of hydrogen cyanide, three mols of hydrogen bromide and three mols of chlorine, all in the gaseous form and in that order were added. The temperature of the reactor was raised to 75° C. The reaction was allowed to proceed for 30 minutes and the temperature was then raised to 90° C. The gaseous reaction product was then removed and allowed to pass into a cooling tank, having a jacket filled with water at 40° C., and maintained therein until the temperature within the tank reached 58° C. The liquid cyanogen bromide formed during cooling was then removed and added to the ammonolysis reactor as noted hereinafter.

The gaseous product remaining in the cooling tank was then led to a second cooling tank maintained at a temperature of 0° C. and was allowed to remain there for 30 minutes. At the end of this time, 1.2 mols of liquid cyanogen chloride were withdrawn and stored for reuse in the process.

The 1.8 mols of ammonium bromide were then added to a reactor containing sufficient dioxane to make a 20% by weight solution of cyanogen chloride in dioxane. The reactor was then cooled in a bath of Dry Ice and alcohol and ammonia gas was admitted slowly into the vapor phase above the reaction mixture so as to maintain the temperature between 40 and 45° C. The addition of ammonia was discontinued after four mols had been added. The reaction mixture was allowed to stand for one hour, during which time the ammonium bromide formed a deposit at the bottom of the vessel and the reaction was completed.

The reaction mixture was filtered under vacuum and the filter cake was washed with additional dioxane which was then combined with the filtrate. The filtrate was distilled and was found to contain 1.5 mols of cyanamide.

The filter cake, which was found to be present to the extent of 1.76 mols, was then dissolved in water and treated with 0.9 mol of a 50% aqueous sulfuric acid solution. At the conclusion of the reaction, the temperature of the reaction was raised to 90° C. and 1.74 mols of hydrogen bromide vapor were obtained. The temperature in the reactor was then raised and all of the water was allowed to distill off, leaving 0.82 mol of ammonium sulfate, of a grade useful without purification as a fertilizer.

EXAMPLE II

The hydrogen bromide and the cyanogen chloride obtained from Example I were charged to a first stage reactor containing five gallons of water. Three mols of hydrogen cyanide, 1.26 mols of hydrogen bromide and three mols of chlorine were then added. Subsequent treatment was in accordance with Example I. The yield of cyanogen bromide obtained after separation from the other components of the first stage reaction was 2.97 mols, the yield of cyanogen chloride was 1.21 mol. The ultimate yield of cyanamide, which was formed by treating the cyanogen bromide solution with 6.5 mols of ammonia in accordance with the procedure of Example I, amounted to 2.42 mols. The yield of ammonium bromide amounted to 2.95 mols and subsequently, upon treatment with 3.1 mols of phosphoric acid (50% aqueous solution), yielded 2.94 mols of hydrogen bromide and 1 mol of ammonium phosphate, directly useful as a fertilizer.

EXAMPLE III

Example II was repeated, substituting 3 mols of nitric acid (50% aqueous solution) for the phosphoric acid. Three mols of ammonium nitrate was obtained, useful as a fertilizer.

It can be readily understood from the foregoing that the process of this invention can be carried out as a series of batch operations or on a continuous basis with conventional apparatus.

I claim:
1. A cyclic process for the preparation of cyanamide from chlorine, hydrogen cyanide, ammonia and a mineral acid, utilizing by-products for production of more cyanamide, comprising reacting chlorine, hydrogen cyanide and hydrogen bromide in the ratios of from about 0.8 to about 1.5 moles of hydrogen cyanide per mole of chlorine, and from about 0.8 to about 1.5 moles of hydrogen cyanide per mole of hydrogen bromide, at a temperature within the range from about 65° C. to about 250° C., to form hydrogen chloride, cyanogen chloride and cyanogen bromide, separating and recovering hydrogen chloride, separating cyanogen chloride and recycling it to suppress cyanogen chloride formation in the said reaction, and favor cyanogen bromide formation from the hydrogen cyanide, separating the cyanogen bromide, and reacting the cyanogen bromide with ammonia at a temperature at which the reaction to form cyanamide proceeds, within the range of from about −40° C. up to about 100° C., in solution in an inert solvent for cyanogen bromide and cyanamide in which solvent cyanamide is soluble in an amount of at least 50 grams per liter and ammonium bromide is soluble in an amount not in excess of about 5 grams per liter at the reaction temperature, and selected from the group consisting of cyclic ethers having an ether oxygen in the ring and at least one ether oxygen for each five carbon atoms, polyoxyalkylene ethers having at least one ether oxygen for each five carbon atoms, sulfones having from four to twelve carbon atoms, esters of aliphatic fatty acids and aliphatic alcohols having from three to about ten carbon atoms, and aliphatic nitriles having from two to about ten carbon atoms, to yield cyanamide and ammonium bromide, separating ammonium bromide from the cyanamide solution, reacting the ammonium bromide with a strong mineral acid to form an ammonium salt of the mineral acid and hydrogen bromide, recycling hydrogen bromide to the initial reaction, and recovering the ammonium salt.

2. A process in accordance with claim 1 in which the mineral acid is sulfuric acid.

3. A process in accordance with claim 1 wherein the mineral acid is phosphoric acid.

4. A process in accordance with claim 1 wherein the mineral acid is nitric acid.

References Cited by the Examiner

UNITED STATES PATENTS

| | | | |
|---|---|---|---|
| 1,379,731 | 5/1921 | Theimer | 23—154 |
| 1,588,731 | 6/1926 | Heuser | 23—14 |
| 2,541,053 | 2/1951 | Hartigan | 23—14 X |
| 2,575,498 | 11/1951 | Mackay et al. | 260—249.7 |
| 3,177,215 | 4/1965 | Foreman et al. | 23—14 X |
| 3,181,932 | 5/1965 | Foreman et al. | 23—190 |

OTHER REFERENCES

Mellor, "A Comprehensive Treatise on Inorganic and Theoretical Chemistry", Longmans, Green & Co., New York, N.Y. volume 2, 1922, page 203.

Williams, "Cyanogen Compounds," Edward Arnold & Co., London, 2nd edition, 1948, pages 5–9, 121 and 122.

BENJAMIN HENKIN, Primary Examiner.

MAURICE A. BRINDISI, Examiner.

E. C. THOMAS, J. J. BROWN, Assistant Examiners.